United States Patent
Mass et al.

(10) Patent No.: US 7,541,080 B2
(45) Date of Patent: *Jun. 2, 2009

(54) WRAPPING MATERIAL WITH A Z-LOCK SYSTEM

(75) Inventors: Nissim Mass, Kibbutz Mishmar HaEmek (IL); Tsafrir Lior, Kibbutz Mishmar HaEmek (IL); Yair Efrati, Kibbutz Mishmar HaEmek (IL); Ilan Asis, Kibbutz Mishmar HaEmek (IL); Hagai Paz, Kibbutz Mishmar HaEmek (IL)

(73) Assignee: Tama Plastic Industry (IL)

( * ) Notice: Subject to any disclaimer, the term of this patent is extended or adjusted under 35 U.S.C. 154(b) by 111 days.

This patent is subject to a terminal disclaimer.

(21) Appl. No.: 10/884,966

(22) Filed: Jul. 7, 2004

(65) Prior Publication Data

US 2005/0034429 A1 Feb. 17, 2005

Related U.S. Application Data

(63) Continuation-in-part of application No. 10/326,418, filed on Dec. 23, 2002, now Pat. No. 6,787,209.

(51) Int. Cl.
| | |
|---|---|
| B32B 9/00 | (2006.01) |
| B32B 3/00 | (2006.01) |
| B32B 3/04 | (2006.01) |
| B65B 41/00 | (2006.01) |
| B65D 65/00 | (2006.01) |

(52) U.S. Cl. .................. 428/40.1; 428/42.2; 428/42.3; 428/57; 428/58; 428/121; 428/124; 428/192; 428/906; 229/87.01; 229/87.19; 53/389.2

(58) Field of Classification Search ............... 428/40.1, 428/41.8, 42.1, 57, 58, 192, 194, 42.2, 42.3, 428/121, 124, 906; 229/87.01, 87.19; 53/389.2; 221/48
See application file for complete search history.

(56) References Cited

U.S. PATENT DOCUMENTS

| 1,960,137 | A | | 5/1934 | Brown |
|---|---|---|---|---|
| 2,607,711 | A | | 8/1952 | Hendricks |
| 2,829,073 | A | | 4/1958 | Williams |
| 2,880,862 | A | | 4/1959 | Sermattei |
| 3,648,350 | A | | 3/1972 | Cassidy et al. |
| 3,850,786 | A | | 11/1974 | Jeffries et al. |
| 4,562,102 | A | | 12/1985 | Rabuse et al. |
| 4,770,913 | A | * | 9/1988 | Yamamoto .................. 428/41.9 |

(Continued)

FOREIGN PATENT DOCUMENTS

DE 8616467.8 9/1986

(Continued)

*Primary Examiner*—Patricia L Nordmeyer
(74) *Attorney, Agent, or Firm*—Lerner, David, Littenberg, Krumholz & Mentlik, LLP

(57) ABSTRACT

Method and material for wrapping items using a wrapping material made up of separate wrapping portions of a predetermined length. The wrapping portions are attached and released at their ends using a Z-lock system including a discrete laminate. The discrete laminate of the Z-lock system holds the wrapping portions together during manufacturing but can also easily release or separate the wrapping portions at a desired point in the wrapping process. The separating of the wrapping portions exposes an adhesive that is use to securely bond at least one wrapping portion to the item being wrapped at the end of a wrapping cycle.

18 Claims, 11 Drawing Sheets

U.S. PATENT DOCUMENTS

| | | | |
|---|---|---|---|
| 5,069,969 A | 12/1991 | McClintock et al. | |
| 5,182,156 A | 1/1993 | Pape et al. | |
| 5,221,393 A | 6/1993 | Heutschi | |
| 5,324,078 A * | 6/1994 | Bane | 283/81 |
| 5,388,300 A | 2/1995 | Hickey | |
| 5,520,308 A | 5/1996 | Berg, Jr. et al. | |
| 5,591,521 A | 1/1997 | Arakawa et al. | |
| 5,817,382 A * | 10/1998 | Cheng | 428/40.1 |
| 6,127,014 A | 10/2000 | McKay, Jr. | |
| 6,182,418 B1 | 2/2001 | McFarland | |
| 6,210,768 B1 * | 4/2001 | Blok et al. | 428/41.8 |
| 6,250,495 B1 | 6/2001 | Bando | |
| 6,787,209 B2 * | 9/2004 | Mass et al. | 428/40.1 |

FOREIGN PATENT DOCUMENTS

| | | |
|---|---|---|
| EP | 1044825 | 10/2000 |
| EP | 1321028 | 6/2003 |
| GB | 2292325 | 2/1996 |
| JP | 6-255670 | 9/1994 |
| JP | 3046016 | 11/1997 |
| WO | WO 2004/054898 | 7/2004 |

* cited by examiner

WRAPPING MATERIAL WITH A Z-LOCK SYSTEM

This application is a continuation-in-part of U.S. application Ser. No. 10/326,418, filed Dec. 23, 2002, now U.S. Pat. No. 6,787,209 the subject matter of which is hereby incorporated by reference in its entirety.

FIELD OF THE INVENTION

The present invention relates to wrapping materials that include a Z-lock system to releasably attach separate wrapping portions of a predetermined length that are held together and released at their lateral ends, and methods of using and assembling the wrapping material. Each wrapping portion constitutes at least one complete wrapping cycle. A complete roll of wrapping material comprises several wrapping portions, which are held and released at their lateral ends. Lateral ends of each wrapping portion are formed into a Z-shape to produce the Z-lock system. The Z-lock system holds the wrapping portions together during manufacturing but also easily releases the wrapping portions at the completion of a wrapping cycle. At the completion of the wrapping cycle, the lateral end of at least one wrapping portion when released retains an adhesive layer that seals the item being wrapped.

BACKGROUND OF THE INVENTION

In conventional wrapping operations whenever an item (round, square, or other shaped bale) is wrapped with film supplied from a wound roll, the film must be adhered to the film layer under it in order to securely wrap an item. At present, it is customary to use film that is tacky on one side, and along its entire length to securely wrap the item.

There are a number of existing methods for manufacturing wrapping material to include film with a tacky surface on one side. Some examples include the use of film that can be manufactured by coating with a layer of adhesive, creating electrostatic charges, co-extrusion or other method known in the field of wrapping. However, the disadvantage in all these methods is that when the adhesive is applied on one entire side, the level of adhesion is not high enough since the film must still be allowed to unwind during wrapping of an item. To this end, there are significant limitations on the level of adhesion that can be achieved, making it particularly difficult to securely wrap an item especially at the tail-end of the wrapping material.

Moreover, there are various forces exerted on the wrapping material, which cause the wrapping material, particularly the tail-end, to come loose after an item is wrapped. Shearing and peeling are examples of some of these forces exerted on wrapping material during wrapping. In addition, if the wrapping material is used outdoors, exposure to the extremes of temperature, moisture and especially wind will cause additional problems with adhesion of the tail-end of the wrapping material.

To overcome these problems, methods have been suggested for maintaining a high level of adhesion for the tail-end of wrapping material when wrapping under extreme conditions. One method of addressing the separation problem of the wrapping material is to produce wrap that includes wrapping portions of a fixed length having very strong adhesive qualities at needed locations along the wrapping material. Although this type of wrapping material tends to have increased adhesive qualities, especially at the tail-end of the wrapping cycle, problems have been experienced with the portions of the wrap sticking to each other when wound onto rolls during the manufacturing process.

SUMMARY OF THE INVENTION

With the foregoing in mind, the methods and material of the present invention provide a solution to the problems noted above in the prior art.

In accordance with an aspect of the present invention, the inventive wrapping material uses an adhesive and at least one releasable layer that covers and protects the adhesive while the wrapping material is on a roll. The releasable layer can be used to prevent different wrapping layers from sticking to each other during the manufacturing process. However, when the wrapping material is unwound, the releasable layer will peel away from the adhesive layer at the end of a wrapping cycle. More specifically, when a wrapping portion of wrap is unwound the releasable layer peels away and completely separates from the adhesive layer. The peeling of the protective layer exposes the adhesive layer for sealing the item being wrapped at the completion of a wrapping cycle. Additionally, the releasable layer remains adhered harmlessly to the continuation of the wrapping material still on the roll for the next wrapping application or cycle. In this way, the wrapping portions that remain on the roll are always protected from the adhesives used in the wrapping process, no matter what the diameter of the roll.

In accordance with a further aspect of the present invention, a method is provided which includes the use of wrapping portions of a predetermined length, wherein each portion has an adhesive layer at a lateral end for gluing and securing the tail-end of the wrapping portion.

In accordance with a further aspect of the present invention, the method is provided which includes connecting wrapping portions using a Z-lock, which facilitates the attachment/connection of two different wrapping portions using strong glue while still allowing easy peeling and separation of the Z-lock at the desired time in a wrapping cycle.

In accordance with a further aspect of the present invention, a method is provided which includes connecting wrapping portions using a Z-lock that includes the use of at least one laminate portion.

In accordance with a further aspect of the present invention, a laminate with at least one adhesive is placed on a wrapping portion at the tail-end of the material after being folded back into a V-fold. The tail-end of another wrapping portion is then laid on top of the V-fold to create the Z-lock. The laminate can then be separated between a releasable layer and an adhesive layer by using a peeling action at the end of the wrapping cycle.

In accordance with another aspect of the invention, the wrapping material includes a Z-lock with wrapping portions that terminate exactly even with the end of an adhesive layer.

In accordance with another aspect of the invention, a method is provided which includes stopping a roll of wrapping material while the element being wrapped continues to move. As a result, the tail-end of a wrapping portion continues to be pulled in the direction of the item being wrapped putting pressure on the Z-lock. As pressure continues to be exerted on the Z lock, the Z-lock separates as the releasable layer peels away from the adhesive layer. The adhesive layer, which is located at the end of the portion, is exposed only at the moment the adhesive layer meets the item being wrapped at the completion of the wrapping cycle.

In accordance with a further aspect of the invention, the releasable layer remains at the end of the portion of wrapping material still on the roll. This releasable layer serves to thicken the beginning of the next portion and improves the feeding of the next portion into a baler, or other type of wrapping equipment.

In accordance with another aspect of the invention, the laminate used in the Z-lock includes several different layers of material.

In accordance with another aspect of the invention, a method is provided which includes lengthening the folds of the Z-lock in order to prevent the possibility of premature separation.

In accordance with another aspect of the invention, the Z-lock includes at least two adhesive areas laterally separated from each other to prevent premature separation.

In accordance with another aspect of the invention, a method is provided which includes the use of double-sided adhesive strips with a lower rate of adhesion on one side of the Z-lock.

DETAILED DESCRIPTION OF THE INVENTION

The material and methods of the present invention will now be discussed with reference to FIGS. 1-12. Like reference numbers and designations in these figures refer to like elements.

Figure 1:
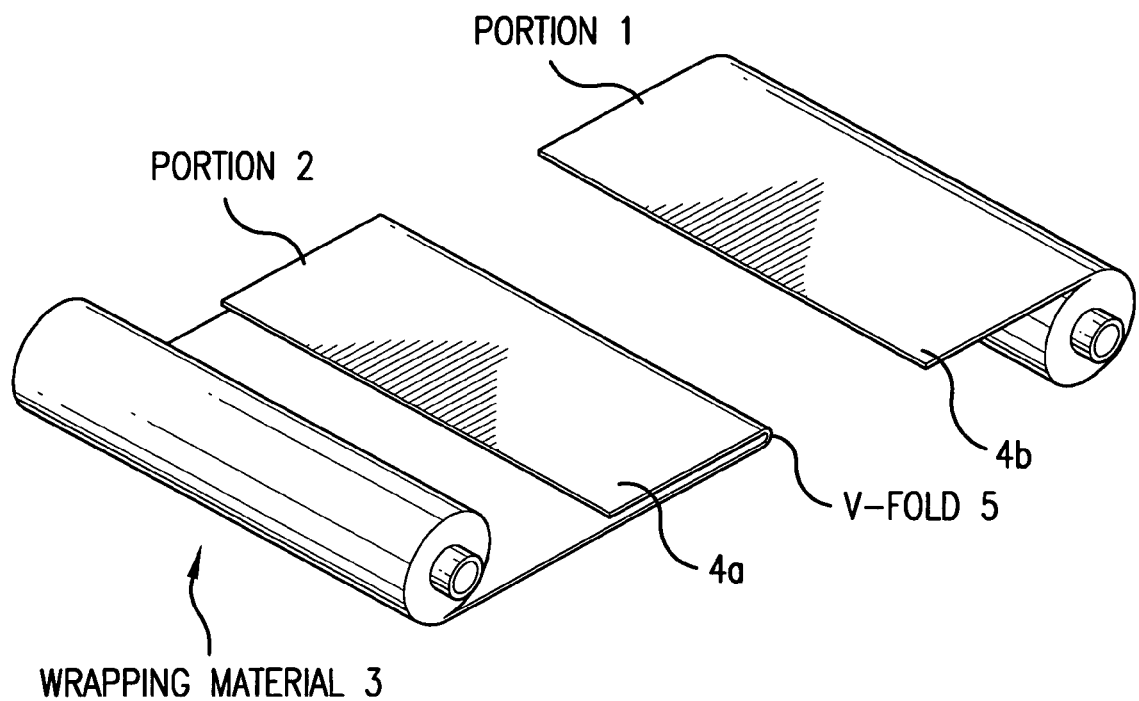
FIG. 1 is a perspective view of the wrapping material in accordance with an embodiment of the present invention.

FIG. 1 is a perspective illustration of the wrapping material in accordance with an embodiment of the present invention. The wrapping material 3, being prepared in FIGS. 1-4, includes at least two wrapping portions 1, 2, with predetermined lengths. The wrapping material 3 can be made from polyolefins, such as polyethylene, or other suitable polymeric material that is approximately 40 to 120 microns thick and 50 to 400 centimeters in width. Additionally, the wrapping material 3 may also be clear or be pigmented. However, the material used for the wrapping portions 1, 2 is in no way limited to the materials discussed above and can include netting or other suitable wrapping material, natural or man-made. The length and width of each wrapping portion 1, 2 should be enough to at least cover the circumference or perimeter of the item (not shown) to be wrapped. Accordingly, the length and width of the wrapping material can vary depending on the size and shape of the item to be wrapped and the wrapping application. Each wrapping portion includes lateral ends 4a, 4b. In FIG. 1, the lateral end 4a of the wrapping portion 2 is folded back on itself to form a V-shaped fold 5.

Figure 2:
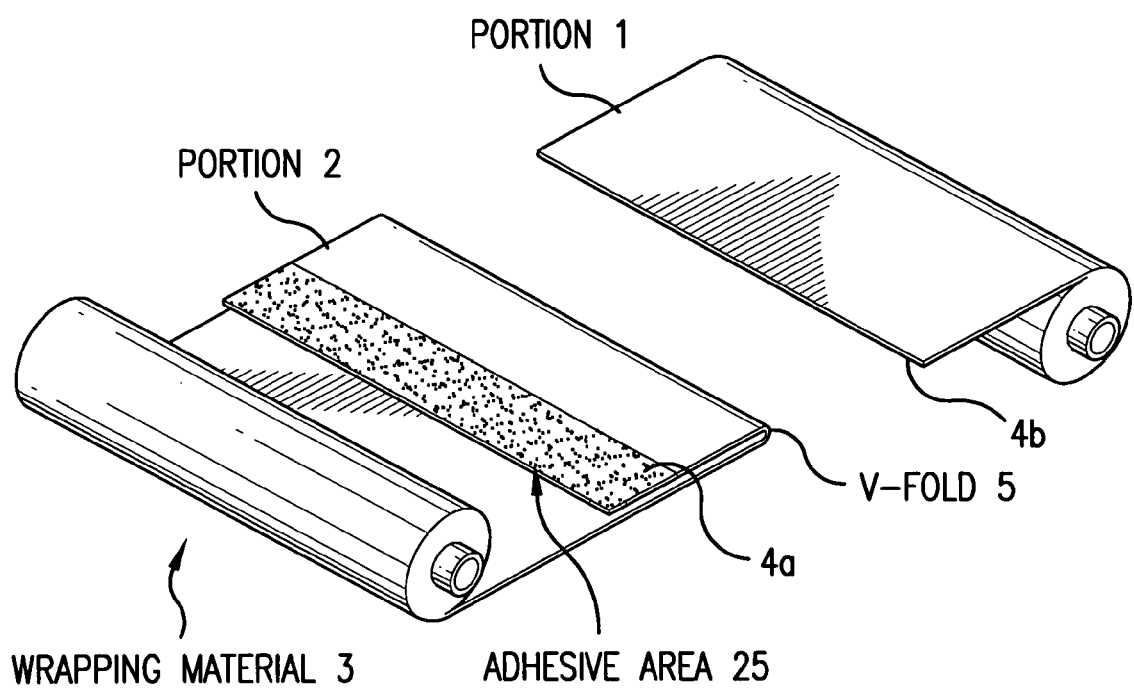
FIG. 2 is another perspective view of the wrapping material in accordance with an embodiment of the present invention.

In FIG. 2, the upper surface of the V-fold 5 includes an adhesive area 25 used for bonding the upper surface of the V-fold 5 to the lateral end 4b of the wrapping portion 1. A releasable layer (not shown) covers at least one surface of the adhesive area 25 at the lateral end of the wrapping portion 2 and is removed to expose an adhesive layer A (not shown) on the surface of the V-fold 5. The adhesive layer A is a high adhesion adhesive for providing permanent bonding of part of the upper surface of the V-fold 5 with the lower surface of an end 4b of another wrapping portion 1, of the wrapping material 3.

Figure 3:
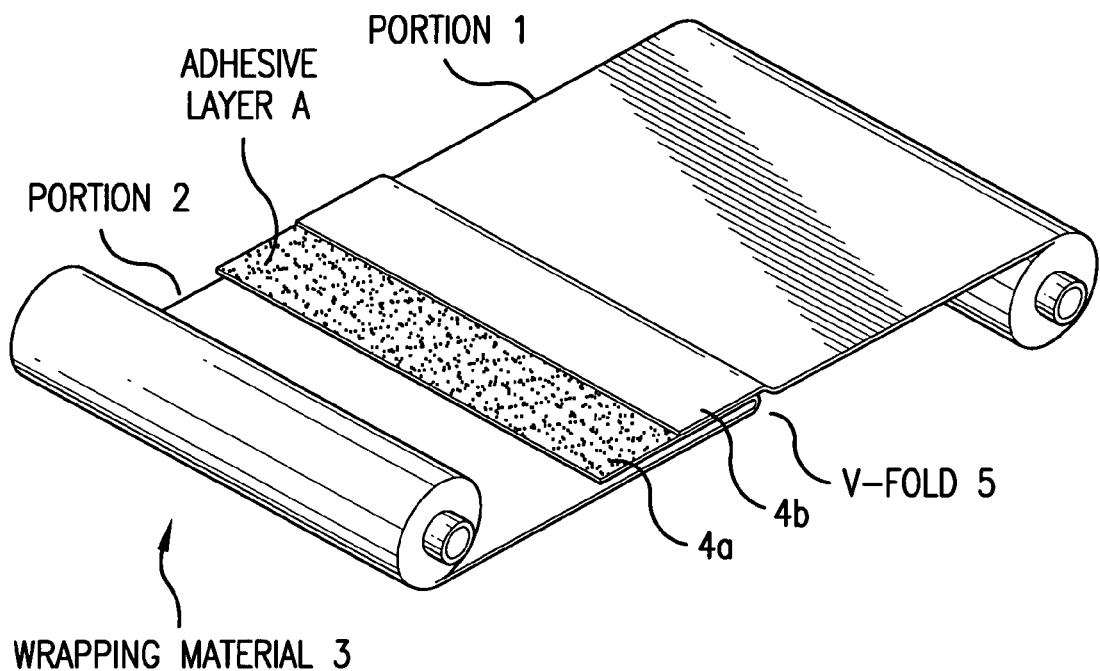
FIG. 3 is a perspective view of the Z-lock in accordance with an embodiment of the present invention.

As seen in FIG. 3, the lateral end 4b of wrapping portion 1 is laid over the upper surface of the adhesive layer A on the lateral end 4a of the wrapping portion 2 for permanent bonding between the adhesive layer A and the lateral end 4b of the wrapping portion 1. The lateral ends 4a and 4b of the wrapping portions 1, 2 terminate at the end of the adhesive layer A.

Figure 4:
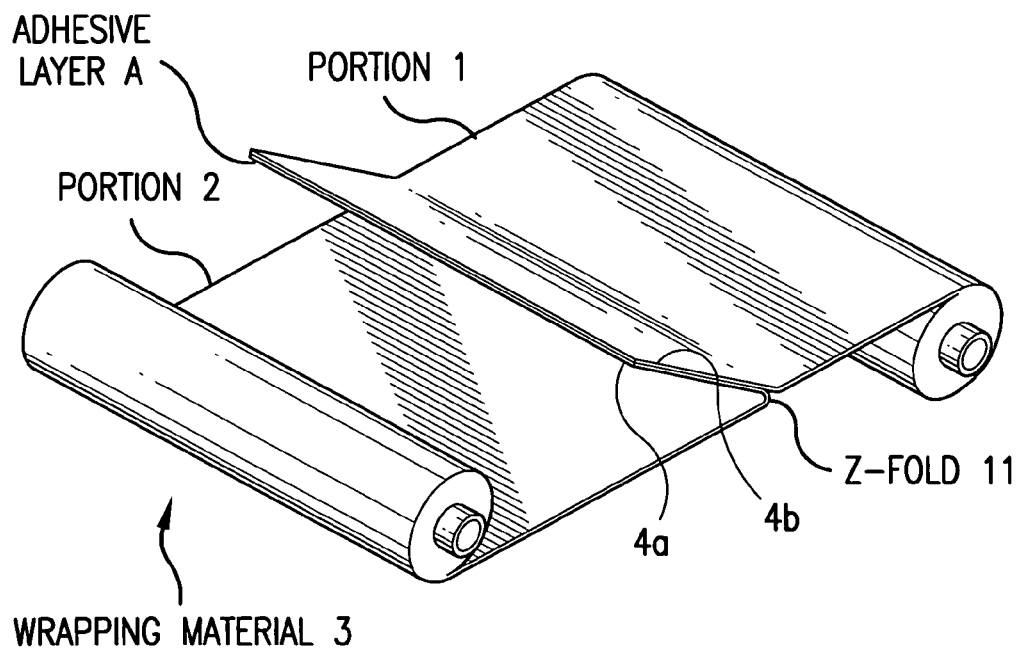
FIG. 4 is another perspective view of Z-lock in accordance with an embodiment of the present invention.

FIG. 4, illustrates an example of the Z-lock system in accordance with an embodiment of the invention. In FIG. 4, the entire Z-shape of the Z-lock system is comprised of the lateral ends 4a and 4b of the wrapping portions 1, 2 and adhesive area 25. More specifically, the Z-shape is formed by folding a lateral end 4a of portion 2 on itself to form the V-shape fold 5. After portion 2 is folded, the lateral end 4b of portion 1 is laid on the top of the V-fold 5 of portion 2. The wrapping portions 1, 2 are adhered to each other using the adhesive layer A of the adhesive area 25 on the upper surface of the V-fold 5. The ends 4a, 4b of the wrapping portions are adhered so there ends 4a, 4b are flush with one another. The addition of portion 1 laid on top of the V-fold 5 of portion 2 is what transforms the V-fold 5 into a Z-lock 11.

In order to successfully wrap an item using the Z-lock system, each portion 1, 2 should terminate exactly even with the end of the adhesive layer A on the lateral ends 4a, 4b of the wrapping portions 1, 2. It is advantageous that the portions 1, 2 be cut exactly. If a wrapping portion 1 is cut so that its length extends beyond the adhesive area 25 of the adhesive portion A, the full benefit of the Z-lock system may not be achieved and it could result in the tail-end of the wrapping portion 1 separating from the item being wrapped. A loose tail-end of the wrapping material can be blown about by the wind and in time cause the wrapping portions 1, 2 to open up after wrapping is complete. Conversely, if the wrapping portions 1, 2 are cut too short, feeding problems can occur since the adhesive area 25 could be partially exposed and stick to rollers or any metal parts of the wrapping equipment while the wrapping material is moved through the equipment during the wrapping process, or stick to itself.

Figure 5:
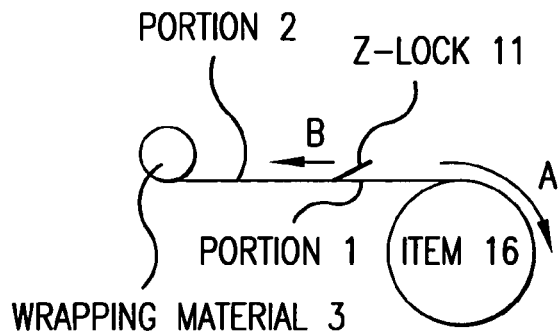
FIGS. 5, 6, 7 and 8 illustrate steps of wrapping an item in accordance with an embodiment of the present invention.
Figure 6:
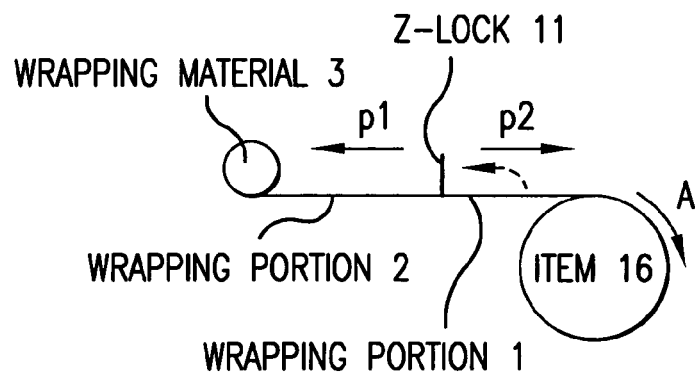

FIGS. 5-8 illustrate a method of wrapping using the Z-lock in accordance with an embodiment of the present invention. FIG. 5 shows a roll of wrapping material 3 having a plurality of releasably attached wrapping portions 1, 2 . . . n on a roll in which adjacent wrapping portions are attached through the inventive Z-lock system 11. By way of example, the wrapping will be carried out on an agricultural baler known in the art for baling hay, cotton or the like (e.g., existing balers and pallet wrapping machines). In FIG. 5, the wrapping portions 1, 2 are fed from the rolled wrapping material 3 and wrapped around the item 16 to be baled in FIG. 5. After a number of turns of the wrap around the item 16 using a predetermined length of a wrapping portion 1, the roll of wrapping material 3 will stop while the element 16 being wrapped continues to turn in direction A. As seen if FIG. 6, the continued movement of the baled item 16 in direction A causes the Z-lock to move to the upright position and pressure p1, p2 to be exerted on the Z-lock 11 in opposite directions.

Figure 7:
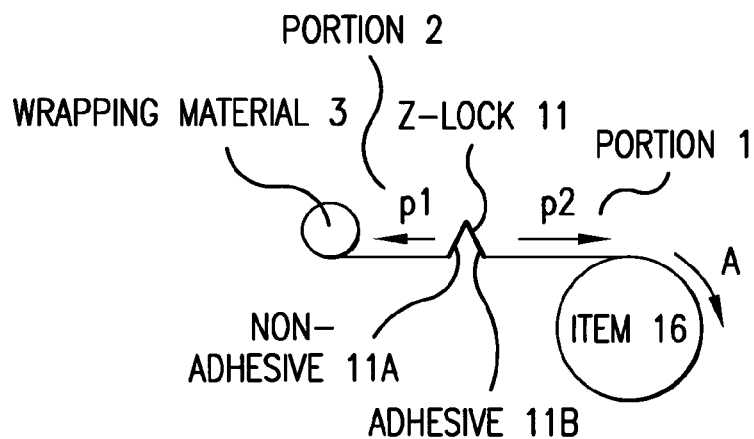
Figure 8:
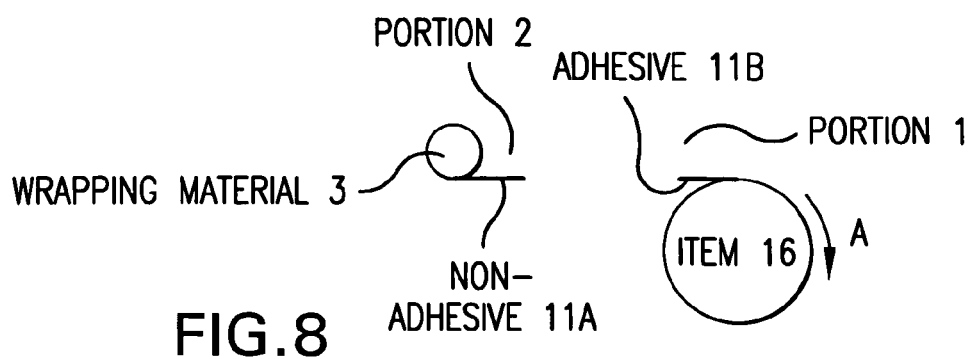

In FIG. 7, the wrapping material roll 3 is stationary, and the item 16 to be baled continues rotating in its clockwise direction A. The increased pressure p1, p2 exerted on the Z-lock 11 connecting the end portions 1, 2 of the wrapping material 3 causes the Z-lock to separate and form a "V" shape having adhesive and non-adhesive layers 11A and 11B. The continued movement of item 16 causes the Z-lock to separate so that a non-adhesive or releasable layer 11A completely peels away from an adhesive layer 11B of the Z-lock 11. Accordingly, the adhesive layer 11B located at the end of wrapping portion 1 is exposed at the moment it meets the element 16 being wrapped at the end of the wrapping cycle, as seen in FIG. 8.

The fact that the adhesive layer is covered by a releasable layer inside the Z-lock 11 until the moment of adhesion makes it possible for all the wrapping portions 1, 2 that make-up the wrapping material 3 (including the Z area) to move smoothly between all the rollers and various parts of the baler during the wrapping process. Additionally, this prevents the adhesive layer 11B in the Z-lock from getting dirty, which would adversely affect the quality of adhesion during wrapping. This is particularly advantageous when working with metal rollers or when working in very dusty conditions. Because of the advantages of the Z-lock 11, the adhesive layer 11B creates a perfect adhesion to the item 16 being wrapped at the end of a wrapping cycle. The wrapping material 3 of the present invention can be fed into unmodified wrapping machinery because the wrapping material 3 is non-adhesive until the Z-lock 11 is separated at the end of a wrapping cycle.

Figure 9:
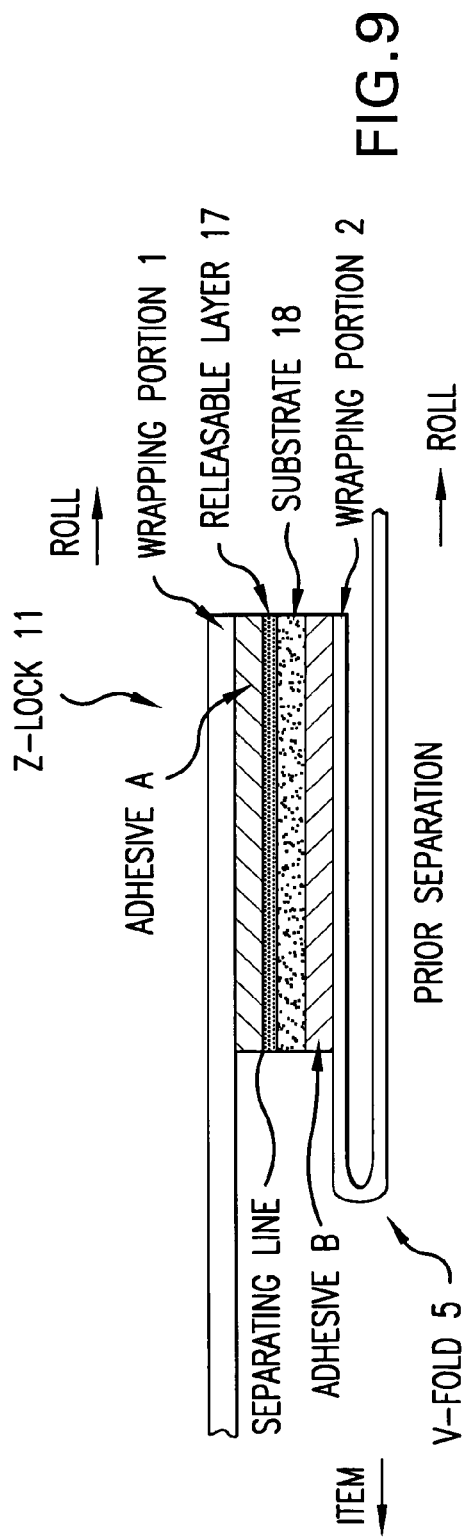
FIGS. 9, 10 and 11 are more detailed illustrations of the different layers of a laminate used for the Z-lock in accordance with an embodiment of the present invention.
Figure 10:
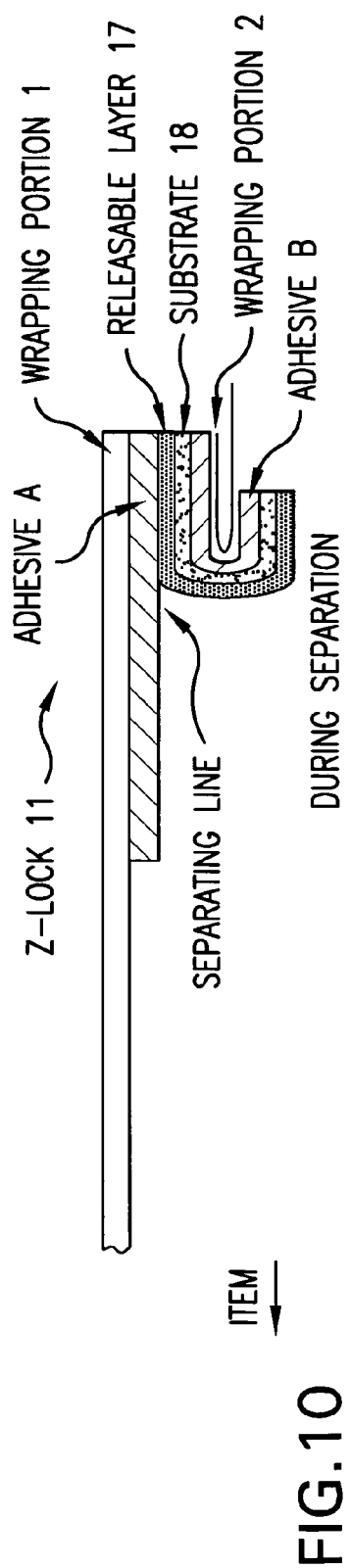
Figure 11:
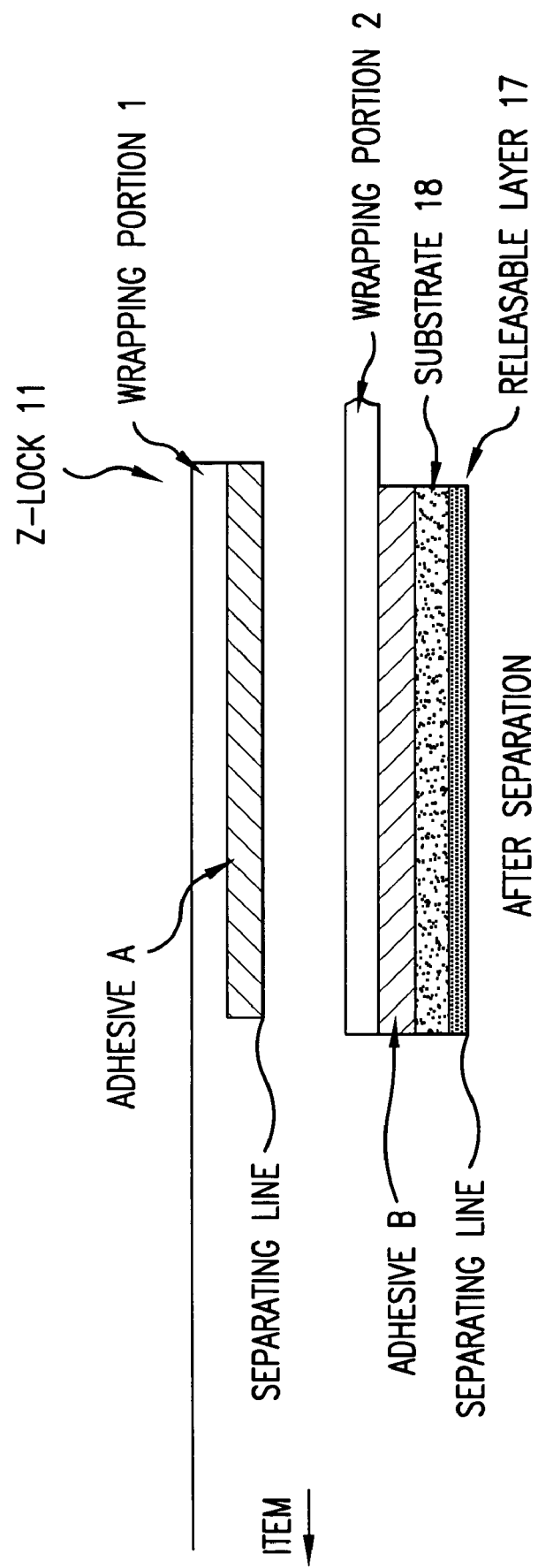

FIGS. 9, 10 and 11 illustrate the use of a laminate material that can be used with the Z-lock 11 in accordance with an embodiment of the invention. In FIG. 9 and by way of example, the Z-lock 11 is comprised of 4 basic layer: first and second high adhesive layers A, B; a lower adhesive releasable layer 17; and a substrate layer 18. The first high adhesive layer A has a top surface that is permanently attached to the lower surface of wrapping portion 1 and flush with the end of portion 1 of the wrapping material 3. The lower surface of the adhesive A is then attached to the top surface of a releasable layer 17. The releasable layer 17 can be any suitable material with lowered adhesive characteristics such as but not limited to silicone. The releasable layer 17 is in contact on it lower surface with a substrate layer 18. The substrate 18 can include, but is not limited to, a material such as paper. This substrate layer 18 provides a surface for permanent bonding between at least one surface of the releasable layer 17 (i.e., lower surface) and the second adhesive B of the laminate. Thus, the releasable layer 17 has only one surface (i.e., upper surface) that is of a lowered adhesive characteristic. Accordingly, the boundary between the upper surface of the releasable layer 17 and the lower surface of the first adhesive layer A functions as the separating line of the Z-lock system 11. However, prior to separation, as shown in FIG. 9, the bond between releasable layer 17 and the first adhesive layer A is sufficient to hold wrapping portions 1, 2 together during manufacturing and placement of the wrapping material 3 on a roll.

FIG. 10 shows the peeling away of the releasable layer 17 from the adhesive layer A at the lowered adhesive boundary (separating line) of the laminate material of the Z-lock 11. The peeling away of the releasable layer 17 is accomplished when the roll of wrapping material stops moving and the item to be wrapped continues to move. The continued movement of the item causes pressure to be exerted on the Z-lock 11 of the wrapping material. As the pressure increases, the laminate material of the Z-lock 11 separates at the lowered adhesive boundary between the releasable layer 17 and the adhesive layer A. The peeling or separating of the wrapping portions 1, 2 continue until the adhesive A is completely separated from the releasable layer 17.

FIG. 11 shows the complete separation of the Z-lock between the lower surface of the first adhesive layer A and the releasable layer 17. The adhesive layer A of wrapping portion 1 is exposed at the moment the adhesive layer A meets the item being wrapped at the end of the wrapping cycle. The releasable layer 17 continues to be bonded to the wrapping portion 2 still on the roll at the end of the wrapping cycle of the item. In this way, the releasable layer 17 protects the wrapping portion 2 from prematurely adhering during any subsequent wrapping cycles.

Figure 12:
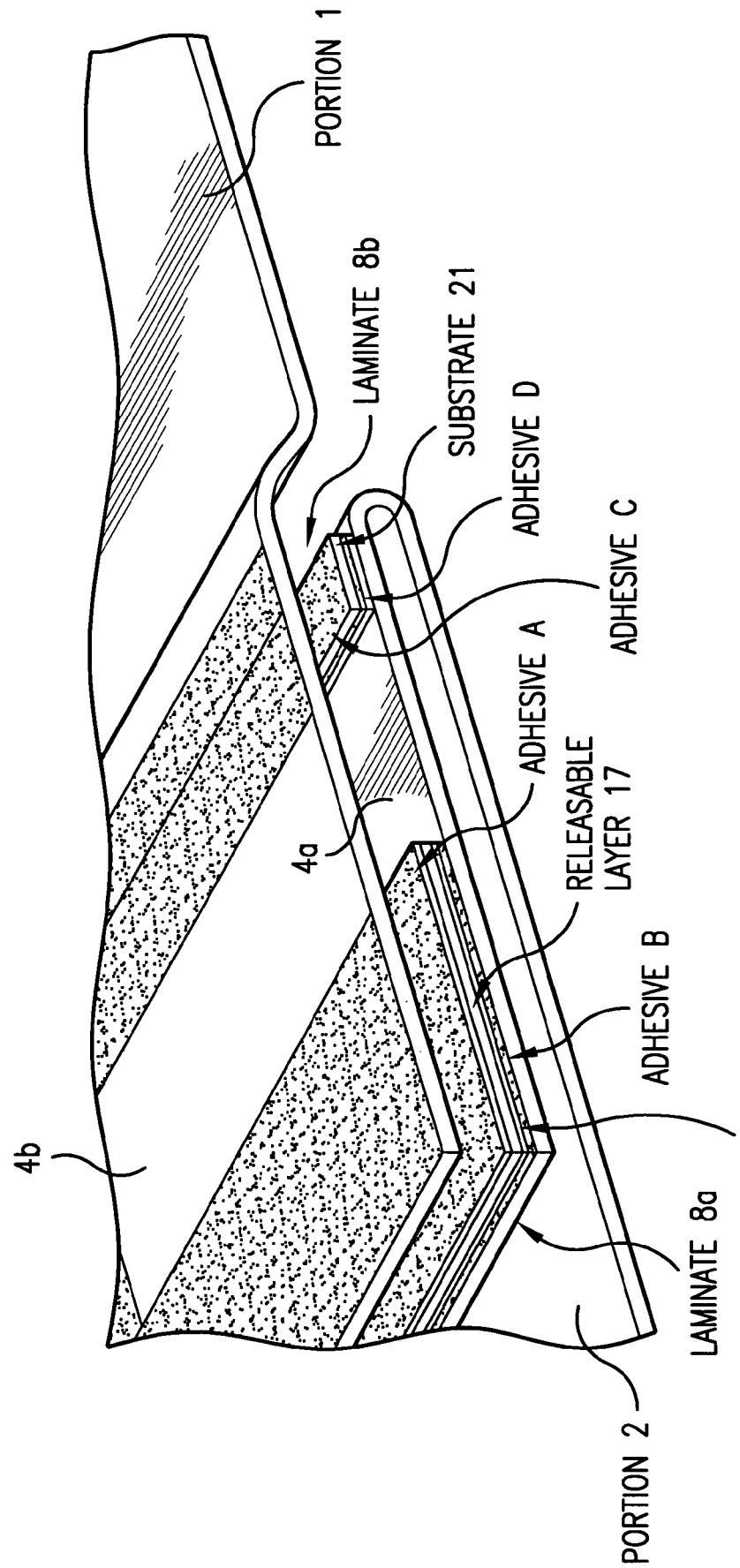
FIG. 12 is a more detailed illustration of the different layers of two laminates used for the Z-lock in accordance with yet another embodiment of the present invention.

In an alternative embodiment, the fold of the Z-lock can be produced at a length longer than the length of a necessary first adhesive area. In this case, a second adhesive area is used to prevent the possibility of premature separation of the Z-lock. FIG. 12 is a more detailed illustration of the Z-lock in accordance with this alternative embodiment. In FIG. 12, the Z-lock includes lateral ends 4a, 4b of the wrapping portions 1, 2 that are held together using two laterally spaced laminate materials 8a, 8b. Laminate material 8a includes several different layers that include, but are not limited to, two adhesive layers A, B, a releasable layer 17, and a substrate layer 18. Similar to the laminate in FIG. 9, 10 & 11, the laminate material 8a has a releasable layer with a lower surface releasably bonded to the lower surface of the adhesive layer A. Thus, the lower surface of the adhesive layer A and the upper surface of the releasable layer 17 provide the boundary of separation for the Z-lock. The final layer of the laminate 8a is a second adhesive layer B that is bonded on one side to a substrate layer 18 and on the other side to another wrapping portion 2 of the wrapping material 3.

The second laminate material 8b is laterally spaced from the first laminate material 8a to help prevent the lateral ends of the wrapping portions 1, 2 from releasing prematurely during the manufacturing or wrapping process. However, to assist in the release of the wrapping portions 1, 2 at the end of a wrapping cycle, the laminate material 8b is comprised of both a high and low adhesive layer C, D separated by a substrate 21. The high adhesive layer C permanently bonds the laminate material 8b to a wrapping portion 2 while the lower adhesive layer D releases the wrapping portions at the end of a wrapping cycle between the upper surface of the lower adhesive layer D and the lower surface of the substrate 21.

Figure 13:
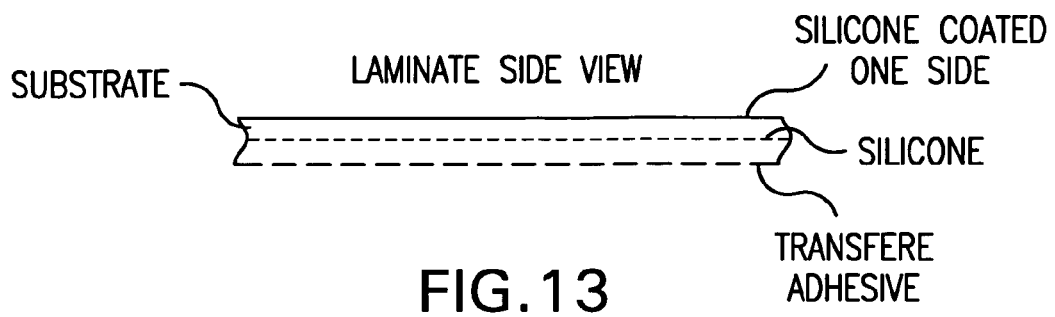
FIG. 13 is a cross-sectional views of a laminate used in accordance with an additional embodiment of the present invention and illustrated in FIGS. 14-18.
Figure 14:
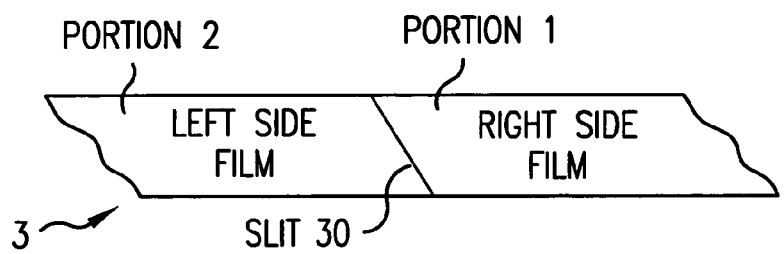
FIGS. 14-18 are perspective views of preparing a wrapping material using the laminate of FIG. 13.
Figure 18:
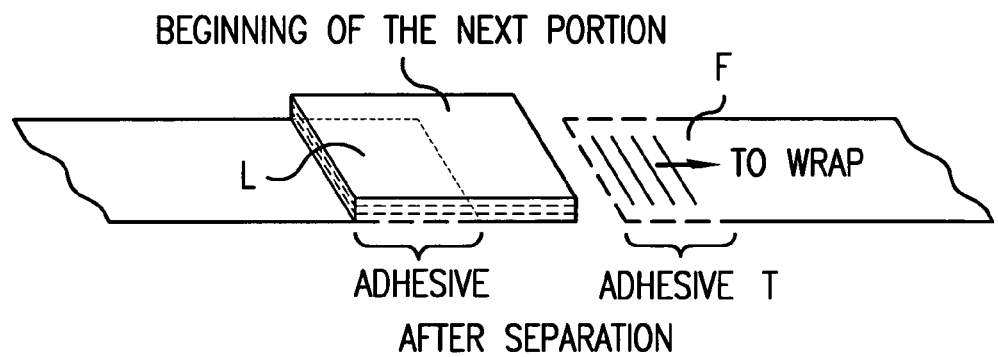
Figure 19:
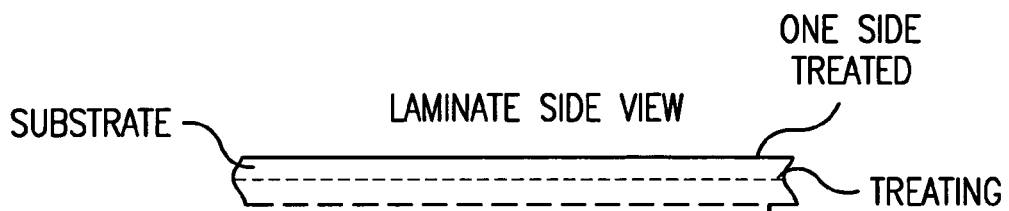
FIG. 19 is a cross-sectional views of a laminate used in accordance with further embodiments of the present invention and illustrated in FIGS. 20-29.
Figure 20:
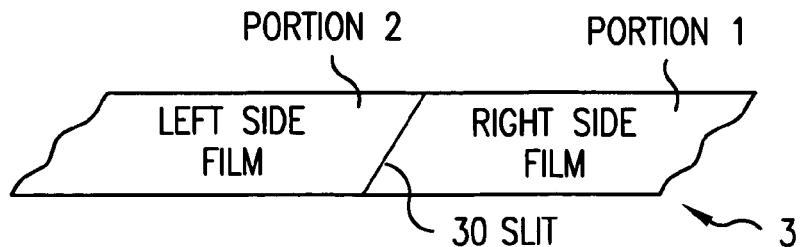
FIGS. 20-29 are perspective views of preparing the wrapping material using the laminate of FIG. 19.

FIGS. 14-18 and 20-29 are perspective illustrations of preparing the wrapping material in accordance with further embodiments of the Z-lock mechanism of the present invention utilizing a discrete laminate illustrated in either FIG. 13 or FIG. 19.

Figure 15:
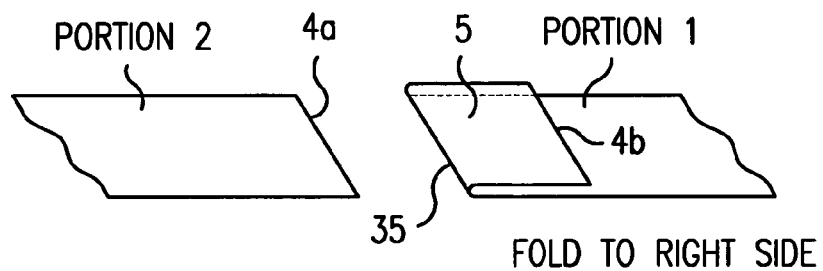

The discrete laminate L utilized in the wrap illustrated in FIGS. 14-18 is shown in cross-section in FIG. 13, in which the laminate L comprises a substrate having an adhesive on one side thereof with an interposed silicone layer that extends over at least a portion of the substrate. The wrapping material 3, being prepared in FIGS. 14-18, includes at least two wrapping portions 1 and 2, with predetermined lengths, i.e., right and left wrapping portions 1 and 2. As in earlier embodiments, wrapping portions 1 and 2 includes respective lateral ends 4b and 4a. In FIG. 15, the lateral end 4b of the right side wrapping portion 1 is folded back on itself to form a V-shaped fold 5.

Figure 16:
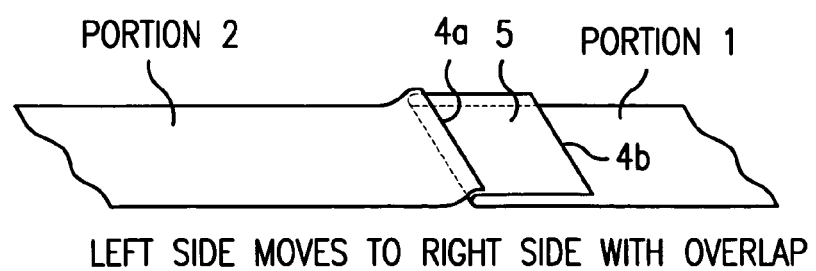
Figure 17:
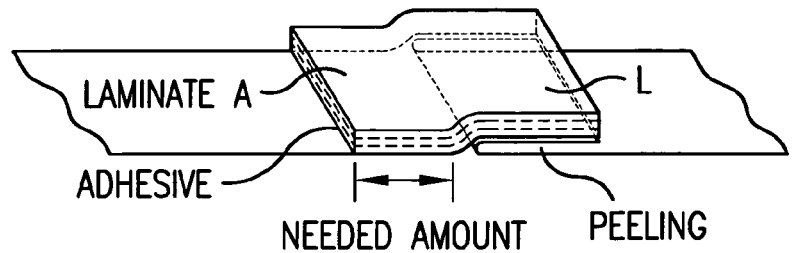

As seen in FIG. 16, the lateral end 4a of the left side wrapping portion 2 is disposed in close proximity to a fold line 35 of the V-fold 5. The lateral end 4a of the left side wrapping portion 2, when disposed in close proximity to the fold line 35 of the V-fold 5, may overlap a portion of the V-fold 5, as illustrated in FIGS. 16 and 17. In no way, however, should the left side wrapping portion 2 completely overlap the entire length of the V-fold 5.

After the left side wrapping portion 2 has been properly positioned, as shown in FIG. 16, substrate laminate L, with its adhesive side facing the right and left side wrapping portions 1 and 2, is spread over both the upper surface of the V-fold 5 of the right side wrapping portion 1 and the upper surface of the lateral end 4a of the left side wrapping portion 2 so as to form a continuous web of wrapping material 3. The adhesive bonding of the laminate L to the upper surface of the V-fold 5 is, as shown in FIG. 18, transferred to the right side wrapping portion 1 as an adhesive tail T during the wrapping stage, while the adhesive between the laminate L and the left side wrapping portion 2 forms a permanent bond there between.

During the wrapping stage, as shown in FIG. 18, the right side wrapping portion 1 is pulled from the right side in the direction shown by arrow D, while the left side wrapping portion 2 is firmly held in place. The releasable bond between the laminate L and the upper surface of the V-fold 5 of the right side wrapping portion 1 is released due to the fact that peeling forces are created between the right side wrapping portion 1 and the laminate L. As such separation occurs, the adhesive layer of the laminate L is transferred to the right side wrapping layer 1 thereby creating the adhesive tail T on the right side wrapping portion 1 while the laminate L remains bonded to the left side wrapping portion 2 that serves as a beginning of the next wrapping portion.

Figure 21:
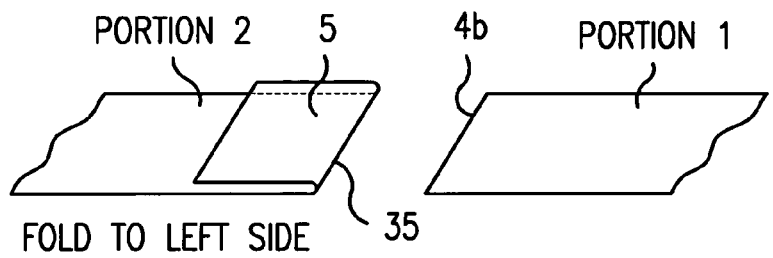

The substrate laminate L utilized in the wrap illustrated in FIGS. 19-29 is shown in cross-section in FIG. 19. As shown in FIG. 19, the laminate L comprises a substrate treated over at least a portion of one side thereof with an adhesive layer being applied to the entire side of the laminate L. The wrapping material 3, being prepared in FIGS. 20-24, includes at least two wrapping portions 1 and 2, with predetermined lengths, i.e., right and left wrapping portions 1 and 2. As in earlier embodiments, wrapping portions 1 and 2 include respective lateral ends 4b and 4a. In FIG. 21, the lateral end 4a of the left side wrapping portion 2 is folded back on itself to form a V-shaped fold 5.

Figure 22:
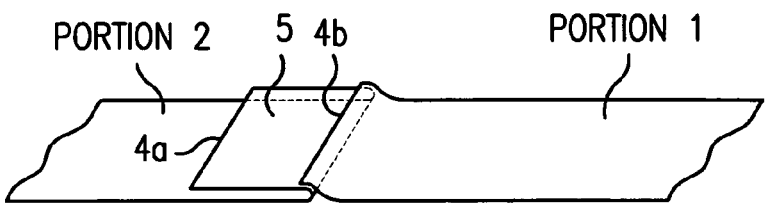
Figure 23:
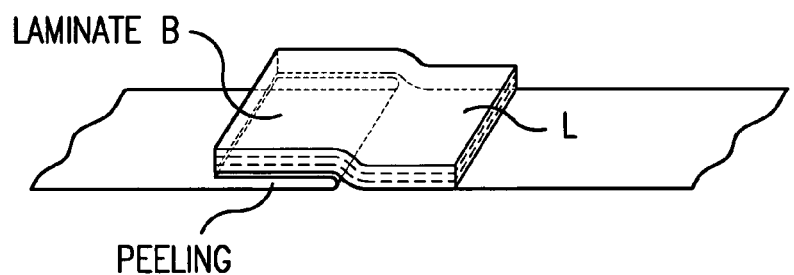

As seen in FIG. 22 the lateral end 4b of the right side wrapping portion 1 is disposed in close proximity to a fold line 35 of the V-fold 5. The lateral end 4b of the right side wrapping portion 1, when disposed in close proximity to the fold line 35 of the V-fold 5, may overlap a portion of the V-fold 5, as illustrated in FIGS. 22 and 23. In no way, however, should the right side wrapping portion 1 completely overlap the entire length of the V-fold 5.

Figure 24:
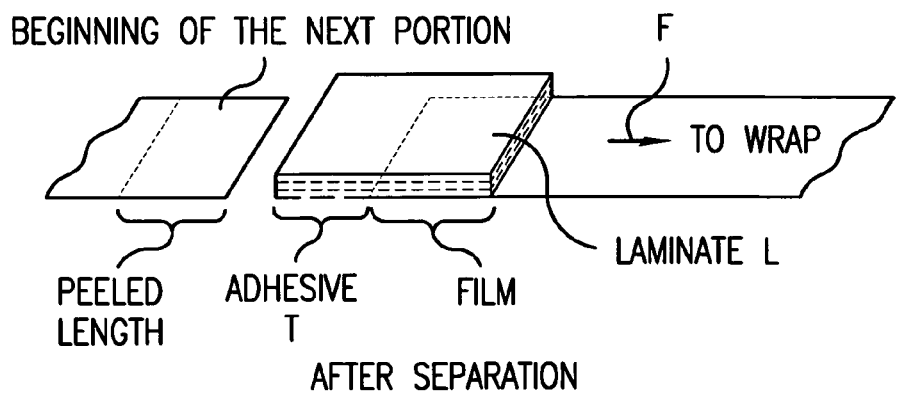
Figure 25:
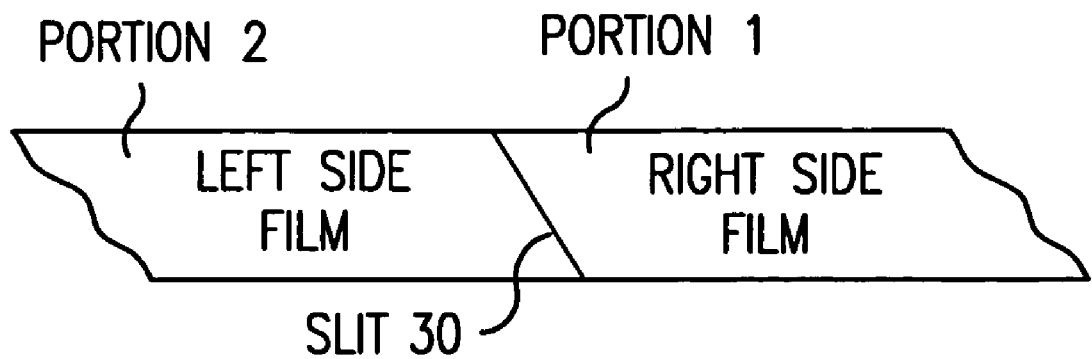
Figure 26:
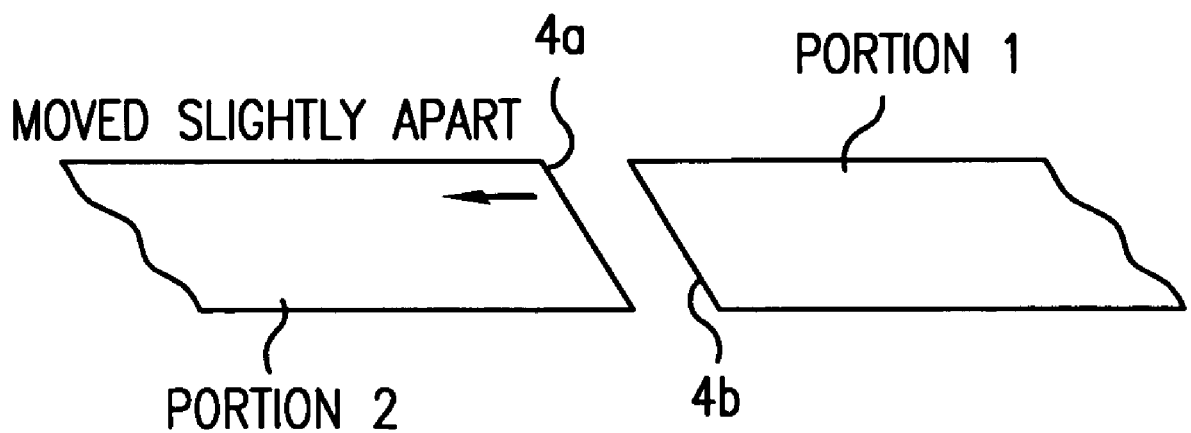

After the right side wrapping portion 1 has been properly positioned, as shown in FIG. 22, substrate laminate L, with its adhesive side facing the right and left side wrapping portions 1 and 2, is spread over both the upper surface of the V-fold 5 of the left side wrapping portion 2 and the upper surface of the lateral end 4b of the right side wrapping portion 1 so as to form a continuous web of wrapping material 3, as shown in FIG. 23. The adhesive bonding of the laminate L to the upper surface of the V-fold 5 is, as shown in FIG. 24, releasable from the left side wrapping portion 2 only so as to form an adhesive tail T on the right side wrapping portion 1 during the wrapping stage. The upper surface of the V-fold 5 may be treated with any material, such as silicone, that facilitates the formation of a releasable bond. As referred to above, the adhesive forms a permanent bond between the laminate L and the right side wrapping portion 1.

During the wrapping stage, as shown in FIG. 18, when the right side wrapping portion 1 is pulled from the right side, in the right direction shown by arrow D, while the left side wrapping portion 2 is firmly held in place. The releasable bond between the laminate L and the upper surface of the V-fold 5 of the left side wrapping portion 2 is released due to the fact that peeling forces are created between the left side wrapping portion 2 and the laminate L. As such separation occurs, the laminate L is released from the left side wrapping portion 2 thereby creating the adhesive tail T on the right side wrapping portion 1 since the laminate L remains permanently bonded to the right side wrapping portion 1. The released lateral end 4a of the left side wrapping portion 2 serves as a beginning of the next wrapping portion.

Figure 27:
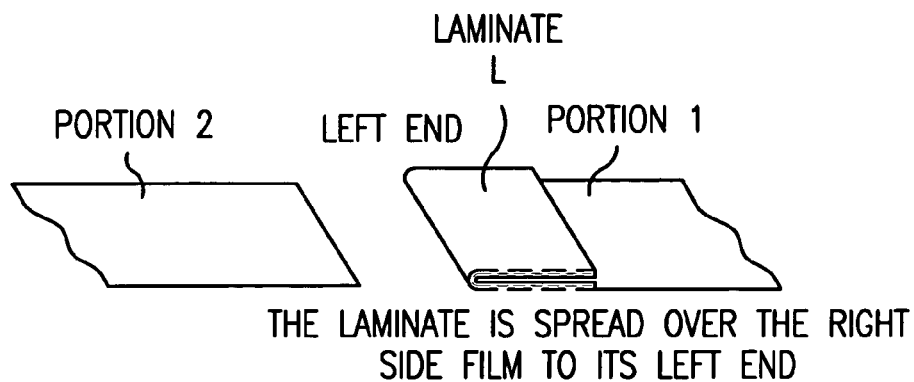

The wrapping material 3, being prepared in FIGS. 25-29, includes at least two wrapping portions 1 and 2, with predetermined lengths, i.e., right and left wrapping portions 1 and 2. As in earlier embodiments, wrapping portions 1 and 2 include respective lateral ends 4b and 4a. In FIG. 27, a portion of the laminate L is permanently bonded to the lateral end 4b of the right side wrapping portion 1, which is subsequently folded back on itself to form a V-shaped fold 5 having an adhesive covered upper surface.

Figure 28:
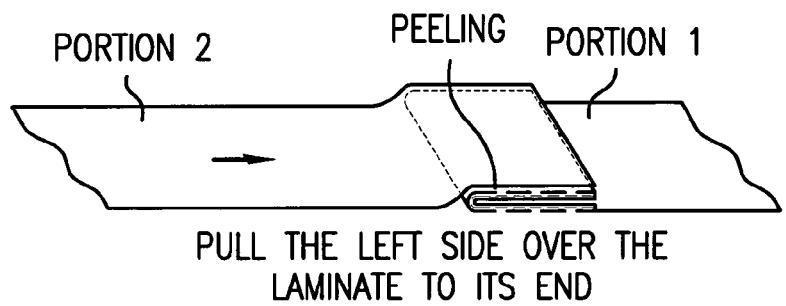
Figure 29:
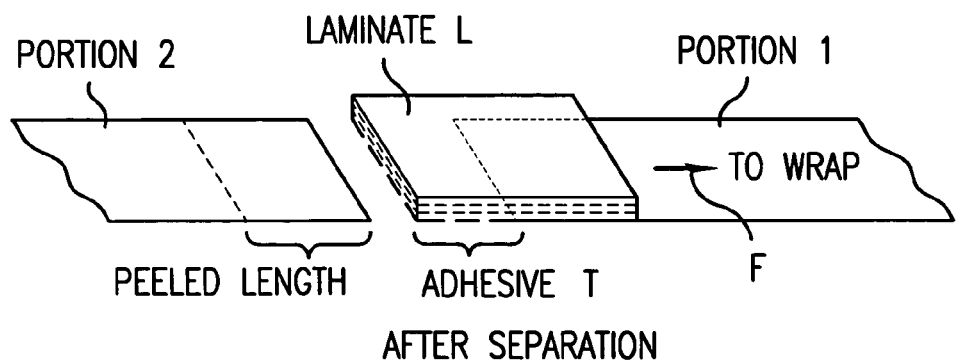

As seen in FIG. 28 the lateral end 4a of the left side wrapping portion 1 is disposed in an overlapping manner and bonded to the upper surface of the V-fold 5, in much the same manner as discussed above with respect to at least the embodiment shown in FIG. 3. Once the laminate L has been bonded to both the right and left side wrapping portions 1 and 2, a continuous web of wrapping material 3 is formed. The adhesive bonding of the lateral end 4a of the left side wrapping portion 2 and the upper surface of the V-fold 5 of the laminate L is, as shown in FIG. 29, releasable from the left side wrapping portion 2 only so as to form an adhesive tail T on the right side wrapping portion 1 during the wrapping stage. The lower surface of the lateral end 4a of the left side wrapping portion 2 may be treated with any material, such as silicone, that facilitates the formation of a releasable bond with the top surface of the V-fold 5. As referred to above, the adhesive forms a permanent bond between the laminate L and the right side wrapping portion 1.

During the wrapping stage, as shown in FIG. 29, when the right side wrapping portion 1 is pulled from the right side, in the right direction shown by arrow D, while the left side wrapping portion 2 is firmly held in place. The releasable bond between the lateral end 4a of the left side wrapping portion 2 and the upper surface of the V-fold 5 of the laminate L is released due to the fact that peeling forces are created between the left side wrapping portion 2 and the laminate L. As such separation occurs, the laminate L is released from the left side wrapping portion 2 thereby creating the adhesive tail T on the right side wrapping portion 1 since the laminate L remains permanently bonded to the right side wrapping portion 1. The released lateral end 4a of the left side wrapping portion 2 serves as a beginning of the next wrapping portion.

It is contemplated by the invention that the laminate is not limited to the materials or layers noted above and can vary depending on the wrapping application and wrapping equipment used.

It is also contemplated by the present invention that suitable materials for the adhesive layers A, B, C and D include, but not limited to, acrylic or styrene glues having tackiness properties of from 4 to 20 Newtons per the American Standard of Testing Methods (ASTM) D1876-01 "Standard Test Method for Peel Resistance of Adhesives" (T-Peel Test) or per ASTM D3330/D "Peel Adhesion of Pressure-Sensitive Tape." It is contemplated by the invention that the layers of adhesives should be from 20 to 120 microns thick. However, the adhesive layers can vary in type and thickness depending on the wrapping application.

In another embodiment, the integrity of an elongated Z-lock area during production and during wrapping can be preserved by using double-sided adhesive strips with a lower rate of adhesion on one side that are added to the Z-lock.

Additionally, the method described in the above figures allows for the connecting of as many wrapping portions as desired, e.g., 10, 100, 1000, etc., using a strong glue or adhesive while still allowing easy separation at the desired time during a wrapping cycle.

It should be emphasized that wrapping material of the present invention is not limited only to any specific material or specific dimensions, and has applications for preparation of all wrapping material, taking into consideration the desirable qualities of each material and the purposes for which the items are being wrapped.

Although illustrative embodiments have been described herein in detail, it should be noted and understood that the descriptions and drawings have been provided for purposes of illustration only and that other variations both in form and detail can be added thereupon without departing from the spirit and scope of the invention. The terms and expressions have been used as terms of description and not terms of limitation. There is no limitation to use the terms or expressions to exclude any equivalents of features shown and described or portions thereof.

We claim:

1. A continuous wrapping material for wrapping one or more items, comprising:
   a right wrapping portion having a first end, an opposite second end, a first surface, and an opposite second surface, said right wrapping portion being folded back on itself to form a V-shaped fold at said first end of said right wrapping portion prior to wrapping an item;
   a left wrapping portion having a first end, an opposite second end, a first surface, and an opposite second surface that correspond, respectively to said first end, said opposite second end, said first surface, and said opposite second surface of said right wrapping portion, said opposite second end of said left wrapping portion overlaps a portion of said V-shaped fold at said first end of said right wrapping portion; and
   a discrete laminate comprising a substrate having a first surface and an opposite second surface, said first surface of said discrete laminate includes an adhesive layer thereon, said adhesive layer facing said right and left wrapping portions, said adhesive on a first portion of said first surface of said discrete laminate releasably adhered to a portion of said first surface of said right wrapping portion along said V-shaped fold and said adhesive on a second portion of said first surface of said discrete laminate being permanently adhered to a portion of said opposite second surface of said left wrapping portion along said opposite second end of said left wrapping portion so as to form a continuous web of wrapping material prior to wrapping the item.

2. The wrapping material of claim 1, wherein the total length of said left wrapping portion and said discrete laminate permanently bonded to said left wrapping portion is greater than the perimeter of an item to be wrapped.

3. The wrapping material of claim 1, wherein the wrapping material is configured on a roll.

4. The wrapping material of claim 1, wherein said left wrapping portion and said right wrapping portion are each formed from at least one of polyolefin, polymeric material, film, and netting.

5. A continuous wrapping material for wrapping one or more items, comprising:
   a right wrapping portion having a first end, an opposite second end, a first surface, and an opposite second surface;
   a left wrapping portion having a first end, an opposite second end, a first surface, and an opposite second surface that correspond, respectively to said first end, said opposite second end, said first surface, and said opposite second surface of said right wrapping portion, said left wrapping portion being folded back on itself to form a V-shaped fold at said opposite second end of said left wrapping portion prior to wrapping an item, said first end of said right wrapping portion overlaps a portion of said V-shaped fold at said opposite second end of said left wrapping portion; and
   a discrete laminate comprising a substrate having a first surface and an opposite second surface, said first surface of said discrete laminate includes an adhesive layer thereon, said adhesive layer facing said right and left wrapping portions, said adhesive layer on a first portion of said first surface of said discrete laminate being releasably adhered to a portion of said opposite second surface of said left wrapping portion along said V-shaped fold and said adhesive layer on a second portion of said first surface of said discrete laminate being permanently adhered to a portion of said first surface of said right wrapping portion along said first end of said right wrapping portion so as to form a continuous web of wrapping material prior to wrapping the item.

6. The wrapping material of claim 5, wherein the total length of said right wrapping portion and said discrete laminate permanently bonded to said right wrapping portion is greater than the perimeter of an item to be wrapped.

7. The wrapping material of claim 5, wherein the wrapping material is configured on a roll.

8. The wrapping material of claim 5, wherein said left wrapping portion and said right wrapping portion are each formed from at least one of polyolefin, polymeric material, film, and netting.

9. A continuous wrapping material for wrapping one or more items, comprising:
   a right wrapping portion having a first end, an opposite second end, a first surface and an opposite second surface;
   a left wrapping portion having a first end, an opposite second end, a first surface, and an opposite second surface that correspond, respectively to said first end, said opposite second end, said first surface, and said opposite second surface of said right wrapping portion; and
   a discrete laminate comprising a substrate having a first surface and an opposite second surface, said first surface having an adhesive layer covering thereon, said adhesive layer covering a first portion of said first surface of said discrete laminate being permanently bonded to a portion of said first surface of said right wrapping portion along said first end of said right wrapping portion, said discrete laminate being folded back on itself to form a V-shaped fold prior to wrapping an item; and
   a portion of said opposite second surface of said left wrapping portion along said second opposite end of said left wrapping portion being disposed in a manner overlapping said V-shaped fold and releasably bonded to said adhesive layer covering a second portion of said first surface of said discrete laminate so as to form a continuous web of wrapping material prior to wrapping the item.

10. The wrapping material of claim 9, wherein the total length of said right wrapping portion and said discrete laminate permanently bonded to said right wrapping portion is greater than the perimeter of an item to be wrapped.

11. The wrapping material of claim 9, wherein the wrapping material is configured on a roll.

12. The wrapping material of claim 9, wherein said left wrapping portion and said right wrapping portion are each formed from at least one of polyolefin, polymeric material, film, and netting.

13. A continuous wrapping material for wrapping one or more items, comprising:
- a plurality of connected wrapping portions, each wrapping portion having a first end, an opposite second end, a first surface, and an opposite second surface, said plurality of serial wrapping portions including at least a first wrapping portion and a second wrapping portion, and
- at least one discrete laminate, each discrete laminate comprising a substrate having a first surface and an opposite second surface, and an adhesive on said first surface of said substrate, said adhesive having a first portion and a second portion, wherein
  - at least one said discrete laminate bonds to both said first wrapping portion and said second wrapping portion to form a continuous wrapping material prior to wrapping an item,
  - said first surface of said first end of said first wrapping portion has a permanent bond to said first portion of said adhesive of said discrete laminate bonded to both said first wrapping portion and said second wrapping portion,
  - said opposite second surface of said opposite second end of said second wrapping portion has a releasable bond to said second portion of said adhesive of said discrete laminate bonded to both said first wrapping portion and said second wrapping portion, and
  - at least one of said first wrapping portion, said second wrapping portion, and said discrete laminate is folded back on itself as part of said continuous wrapping material.

14. The wrapping material of claim 13, wherein said adhesive on said second portion of said discrete laminate includes a layer of releasable adhesion boundary.

15. The wrapping material of claim 14, wherein said releasable adhesion boundary comprises a transfer adhesive.

16. The wrapping material of claim 13, wherein the total length of said first wrapping portion and said discrete laminate permanently bonded to said first wrapping portion is greater than the perimeter of an item to be wrapped.

17. The wrapping material of claim 13, wherein the wrapping material is configured on a roll.

18. The wrapping material of claim 13, wherein the plurality of wrapping portions are formed from at least one of polyolefin, polymeric material, film, and netting.

* * * * *